A. B. FARQUHAR.
Plows.

No. 158,580.

2 Sheets--Sheet 1.

Patented Jan. 12, 1875.

Attest:
J. Mason Gotzler
Thos. J. Williams

Inventor:
Arthur B Farquhar
per R.S. & A.P. Lacey

A. B. FARQUHAR.
Plows.

No. 158,580.

2 Sheets--Sheet 2.

Patented Jan. 12, 1875.

Attest:
G. B. Towles.
J. B. Holderby

Inventor:
A. B. Farquhar
per R. S. & A. P. Lacey, attys

UNITED STATES PATENT OFFICE.

ARTHUR B. FARQUHAR, OF YORK, PENNSYLVANIA.

IMPROVEMENT IN PLOWS.

Specification forming part of Letters Patent No. 158,580, dated January 12, 1875; application filed September 19, 1874.

*To all whom it may concern:*

Be it known that I, ARTHUR B. FARQUHAR, of York, in the county of York and State of Pennsylvania, have invented certain new and useful Improvements in Plows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to provide an improved plow for the cultivation of cotton and other row crops, and which will be particularly adapted for use in the sticky waxy soils of the Southern States; that will be light of draft and self-sharpening; that will keep scoured bright and clean at all times; that will wear evenly and preserve the same shape till worn out, and that will throw sufficient earth to the roots of the plants, and dispose of the surplus soil in rear of the sweep, so as to leave the surface of the ground between the rows comparatively smooth.

It consists in the peculiar construction and formation of the sweep, in the manner hereinafter fully set forth.

Figure 1:
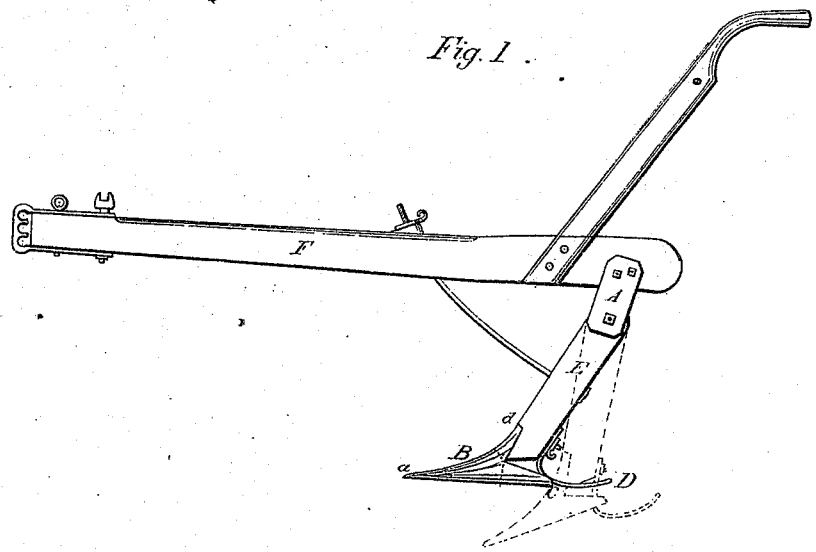
Figure 2:
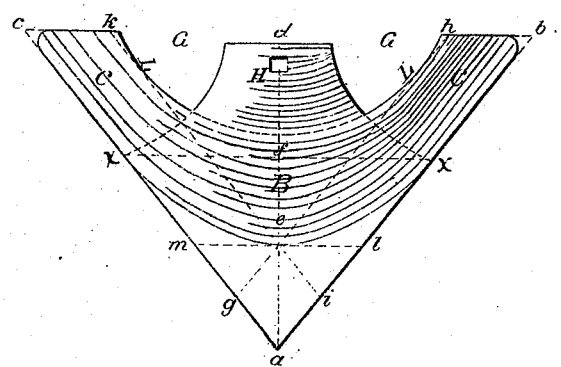
Figure 3:
Figure 4:
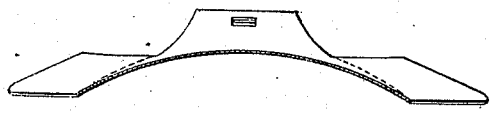

In the drawings, Figure 1 is a side elevation of the plow complete, and Figs. 2, 3, and 4 are respectively a plan or front view, a side elevation, and a cross-section on the line $x\ x$ of the sweep.

F is the beam; E, the standard, which is secured to the beam by the plates A, so that it will have a swinging motion, for the purpose of adjusting the depth of furrow to be cut by the sweep. There is cut in the front side of the lower end of the standard a half-mortise, in which is fitted the shank of sweep, and in which the latter is secured by a single bolt. D is a curved adjustable sole, attached to the rear of the standard, for the purpose of steadying the movements of the plow, and for regulating the depth of furrow. B is the sweep. It is made with shank H, wings C C, and notches G G. In manufacturing the sweep I use a steel plate cut in the form of a wide isosceles triangle, the shorter sides of which are used for the cutting-edges.

When the plate is pressed or otherwise stamped into proper shape, the cutting-edges will be on the same plane, and in use both will wear equally and uniformly, and the original shape of the sweep will be preserved till worn out.

The plate when first cut, and the sweep as formed therefrom, are constructed in accordance with exact mathematical proportions, and curved and straight lines, so that the sweep when completed presents a broad base, a short perpendicular depth with a long slightly-inclined face and broad flattened point, so that it will cut easily through any kind of soil, and obviate friction and clogging, and lessen wear and draft; rapidly-receding sides falling back from the crown or central line in regularly-curved lines, resembling, slightly, a double-mold-board plow; two straight wings with flat faces, having an inclination to the furrow of about thirty degrees, and provided with curved upper edges, to prevent too great quantity of earth from being thrown to the rear of the sweep; two rear notches, through which the excess of earth is deposited soon after being cut, and a shank for attaching to the standard.

L L represent the curved edges of the wings C C. They correspond the one with the other. The wings as they extend back gradually increase in width by these curves.

The sweep is so constructed that in its operation one-half the soil will be carried and thrown to the rear through the notches G G, and the other half, desired for direct application to the crops, will be carried by the wings C C and deposited at or near the roots of the plants.

The gradually-expanding base of the sweep, together with the additional earth cut by the edges of the wings, would cause the soil to crowd upward on the wings, and, if not prevented, a portion thereof would pass over the top through the notches. To prevent this, I have constructed the wings with the curved edges, as shown, so that as the quantity of earth increases, there will be a corresponding increase in the width of the wings, which will prevent any portion of the earth from passing over the tops thereof, and the whole amount required for use by the plants is thrown as designed.

Having described my invention, what I claim, and desire to secure by Letters Patent, is—

The sweep B, made of a triangular plate of steel, the shorter sides forming the cutting-edges, and shaped to present a level point rising to the rear in regular curved lines, and having the notches G cut away, as shown and described, forming the wings C, with curved edges L, all as and for the purpose set forth.

In testimony that I claim the foregoing as my own I hereto affix my signature in presence of two witnesses.

ARTHUR B. FARQUHAR.

Witnesses:
ALFRED JESSOP,
WM. F. EICHAR.